United States Patent
Morgan

(10) Patent No.: US 6,649,571 B1
(45) Date of Patent: Nov. 18, 2003

(54) METHOD OF GENERATING GAS BUBBLES IN OLEAGINOUS LIQUIDS

(75) Inventor: Julie Benedetta Maria Aline Morgan, Lafayette, LA (US)

(73) Assignee: Masi Technologies, L.L.C., Houston, TX (US)

(*) Notice: Subject to any disclaimer, the term of this patent is extended or adjusted under 35 U.S.C. 154(b) by 0 days.

(21) Appl. No.: 09/542,817

(22) Filed: Apr. 4, 2000

(51) Int. Cl.⁷ .............................. C09K 7/00; C09K 7/06

(52) U.S. Cl. ..................... 507/102; 507/202; 507/127; 507/233; 516/13

(58) Field of Search ................................ 507/102, 202, 507/127, 233; 516/13

(56) References Cited

U.S. PATENT DOCUMENTS

| | | | |
|---|---|---|---|
| 1,737,623 A | 12/1929 | Thomson | |
| 1,824,221 A | 9/1931 | Mason | |
| 2,043,633 A | 6/1936 | Strauch | |
| 2,224,135 A | 12/1940 | Boehm et al. ................ 92/2 |
| 2,531,427 A | 11/1950 | Hauser ..................... 260/448 |
| 2,531,812 A | 11/1950 | Hauser ..................... 252/8.5 |
| 2,713,029 A | 7/1955 | Fuller ...................... 252/8.5 |
| 2,713,030 A | 7/1955 | Brink et al. .............. 252/8.5 |
| 2,808,887 A | 10/1957 | Erwin ....................... 166/43 |
| 2,818,230 A | 12/1957 | Davis ....................... 255/1.8 |
| 2,966,506 A | 12/1960 | Jordan ..................... 260/448 |
| 2,974,134 A | 3/1961 | Pollitzer .................. 260/209 |
| 3,065,170 A | 11/1962 | Dumbauld et al. ........ 252/8.5 |
| 3,208,524 A | 9/1965 | Horner et al. ............ 166/32 |
| 3,229,777 A | 1/1966 | Rogers et al. ............ 175/71 |
| 3,243,000 A | 3/1966 | Patton et al. ............ 175/65 |
| 3,246,696 A | 4/1966 | Fox, Jr. .................... 166/46 |
| 3,251,768 A | 5/1966 | Walker ..................... 252/8.5 |
| 3,269,468 A | 8/1966 | Phansalkar et al. ...... 175/71 |
| 3,301,848 A | 1/1967 | Halleck .................... 260/209 |
| 3,313,362 A | 4/1967 | Schneider ................. 175/71 |
| 3,328,295 A | 6/1967 | Lummus et al. .......... 252/8.5 |
| 3,334,052 A | 8/1967 | Kurz ......................... 252/316 |
| 3,390,723 A | 7/1968 | Hower et al. ............. 166/30 |
| 3,393,738 A | 7/1968 | Bernard et al. ........... 166/29 |
| 3,509,951 A | 5/1970 | Enochs ..................... 175/70 |
| 3,610,340 A | 10/1971 | Hutchinson et al. ...... 166/311 |
| 3,628,615 A | 12/1971 | Chenevert ................. 175/70 |
| 3,671,022 A | 6/1972 | Laird et al. ............... 261/29 |
| 3,728,259 A | 4/1973 | Christman ................. 252/8.5 C |
| 3,743,613 A | 7/1973 | Coulter et al. ............ 260/17.4 ST |
| 3,754,561 A | 8/1973 | Sharman et al. .......... 137/13 |
| 3,819,519 A | 6/1974 | Sharman et al. .......... 252/8.5 C |
| 3,844,361 A | 10/1974 | Jackson .................... 175/65 |
| 3,953,336 A | 4/1976 | Daigle ...................... 252/8.5 B |
| 3,986,964 A | 10/1976 | Smithey ................... 252/8.5 A |
| 3,988,246 A | 10/1976 | Hartfiel ................... 252/8.5 A |
| 3,998,742 A | 12/1976 | Walker ..................... 252/8.5 A |
| 4,008,766 A | 2/1977 | Savins ...................... 252/8.5 A |
| 4,013,568 A | 3/1977 | Fischer et al. ............ 252/8.5 C |
| 4,036,764 A | 7/1977 | Fischer et al. ............ 639/8.5 C |
| 4,088,583 A | 5/1978 | Pyle et al. ................ 252/8.5 C |
| 4,092,252 A | 5/1978 | Fischer et al. ............ 252/8.5 A |
| 4,105,578 A | 8/1978 | Finlayson et al. ........ 252/316 |
| 4,112,025 A | 9/1978 | Wilson et al. ............. 261/29 |
| 4,155,410 A | 5/1979 | Jackson et al. ............ 919/142 |
| 4,162,970 A | 7/1979 | Zlokarnik ................. 210/15 |
| 4,172,800 A | 10/1979 | Walker ..................... 252/8.5 C |
| 4,172,801 A | 10/1979 | Jackson .................... 252/8.5 A |
| 4,217,231 A | 8/1980 | King ......................... 252/8.55 R |
| 4,233,438 A | 11/1980 | Myers et al. .............. 536/1 |
| 4,247,405 A | 1/1981 | Wier ......................... 252/8.55 D |
| 4,262,757 A | 4/1981 | Johnson, Jr. et al. ..... 175/67 |
| 4,269,279 A | 5/1981 | House ....................... 175/66 |
| 4,287,086 A | 9/1981 | Finlayson et al. ........ 252/316 |
| 4,299,825 A | 11/1981 | Lee ........................... 424/180 |
| 4,301,868 A * | 11/1981 | Scherubel et al. ......... 507/102 |
| 4,304,740 A | 12/1981 | Cernoch ................... 261/121 R |
| 4,329,448 A | 5/1982 | Cox et al. ................. 536/123 |
| 4,342,866 A | 8/1982 | Kang et al. ............... 536/119 |
| 4,378,049 A | 3/1983 | Hsu et al. ................. 166/295 |
| 4,387,032 A | 6/1983 | Chiesa, Jr. ................. 252/3 |
| 4,391,339 A | 7/1983 | Johnson, Jr. et al. ..... 175/393 |
| 4,417,985 A | 11/1983 | Keane ....................... 210/707 |
| 4,422,947 A | 12/1983 | Dorsey et al. ............. 252/8.5 |

(List continued on next page.)

FOREIGN PATENT DOCUMENTS

EP     WO98/36151     8/1998

OTHER PUBLICATIONS

Article entitled "Hidraulica Forajului," also an English Translation of pp. 444–455, (1982).

"Using Oil Analysis to Monitor the Depletion of Defoamant Additives," Oil Analysis.com, (1998) @ http://www.noria.com/learn/ler7.html (last visited Jun. 6, 2001).

Article entitled "Underbalanced Drilling Manual," Published by Gas Research Institute, GRI Ref. No. GRI–97/0236., 1997.

Article entitled "Treatability of Water–based Drilling Fluids Using Colloidal Gas Aphrons," D. Roy, K.T. Valsaraj, and V.J. Amedee, Departments of Civil Engineering and Chemical Engineering, Louisiana State University, Baton Rouge, LA 70803, vol. 5, No. 1, Mar. 1992.

SPE 53984 "Lagomar's Integrated Field Laboratory for Intensive Evaluation of Technologies," G. de Carvajal, A. Velasquez, J. Graterol, F. Ramirez and M. Medina, Society of Petroleum Engineers, 1999.

(List continued on next page.)

*Primary Examiner*—Philip Tucker
(74) *Attorney, Agent, or Firm*—Leslie V. Payne, Esq.; Conley Rose, P.C.

(57) ABSTRACT

Disclosed is a method of generating microbubbles in oleaginous liquids which comprises adding a silicone oil to the oleaginous liquid and thereafter subjecting the liquid to mechanical forces in the presence of a gas. Also disclosed are oil base well drilling and servicing fluids having a low shear rate viscosity as measured with a Brookfield Viscometer at 0.5 rpm of at least 10,000 centipoise and having incorporated therein microbubbles generated by the disclosed method, and a method of drilling a well wherein there is circulated within the wellbore during drilling the oil base, microbubble-containing fluid disclosed.

91 Claims, No Drawings

U.S. PATENT DOCUMENTS

| | | | |
|---|---|---|---|
| 4,425,241 A | 1/1984 | Swanson | 252/8.5 |
| 4,425,461 A | 1/1984 | Turner et al. | 524/400 |
| 4,432,881 A | 2/1984 | Evani | 252/8.5 A |
| 4,442,011 A | 4/1984 | Thaler et al. | 252/8.5 M |
| 4,442,018 A | 4/1984 | Rand | 252/307 |
| 4,464,269 A | 8/1984 | Walker et al. | 252/8.55 R |
| 4,485,020 A | 11/1984 | Shay et al. | 252/8.55 D |
| 4,486,333 A * | 12/1984 | Sebba | 516/13 |
| 4,499,210 A | 2/1985 | Senuma et al. | 521/91 |
| 4,503,084 A | 3/1985 | Baird et al. | 426/573 |
| 4,519,923 A | 5/1985 | Hori et al. | 252/8.5 |
| 4,549,907 A | 10/1985 | Kohn | 106/208 |
| 4,561,985 A | 12/1985 | Glass, Jr. | 252/8.5 A |
| 4,565,647 A | 1/1986 | Llenado | 252/354 |
| 4,610,729 A | 9/1986 | Keane | 134/25.1 |
| 4,614,235 A | 9/1986 | Keener et al. | 166/301 |
| 4,664,843 A | 5/1987 | Burba, III et al. | 252/315.5 |
| 4,684,479 A | 8/1987 | D'Arrigo | 252/307 |
| 4,698,148 A | 10/1987 | Keane | 208/390 |
| 4,704,200 A | 11/1987 | Keane | 208/390 |
| 4,707,281 A | 11/1987 | Miller et al. | 252/8.514 |
| 4,717,515 A | 1/1988 | Forsyth et al. | 261/122 |
| 4,740,319 A | 4/1988 | Patel et al. | 252/8.515 |
| 4,743,383 A | 5/1988 | Stewart et al. | 252/8.51 |
| 4,758,356 A | 7/1988 | Downs | 252/8.51 |
| 4,816,551 A | 3/1989 | Oehler et al. | 528/295.3 |
| 4,832,833 A | 5/1989 | Keane | 208/390 |
| 4,861,499 A | 8/1989 | Neff et al. | 252/8.551 |
| 4,876,017 A | 10/1989 | Trahan et al. | 252/8.51 |
| 4,900,457 A | 2/1990 | Clarke-Sturman et al. | 252/8.514 |
| 4,964,465 A | 10/1990 | Surles | 166/295 |
| 4,964,615 A | 10/1990 | Mueller et al. | 252/8.511 |
| 4,978,461 A | 12/1990 | Peiffer et al. | 252/8.511 |
| 5,002,672 A | 3/1991 | Hayes et al. | 252/8.513 |
| 5,003,060 A | 3/1991 | Vinot | 536/114 |
| 5,021,170 A | 6/1991 | Shumate et al. | 252/8.515 |
| 5,024,276 A | 6/1991 | Borchardt | 166/308 |
| 5,026,735 A | 6/1991 | Stern | 521/50 |
| 5,030,366 A | 7/1991 | Wilson et al. | 252/8.551 |
| 5,075,033 A | 12/1991 | Cody et al. | 252/315.2 |
| 5,086,974 A | 2/1992 | Henshaw | 239/590 |
| 5,094,778 A | 3/1992 | Burba, III et al. | 252/315.2 |
| 5,105,884 A | 4/1992 | Sydansk | 166/270 |
| 5,106,517 A | 4/1992 | Sheu et al. | 507/110 |
| 5,110,487 A | 5/1992 | Current | 252/8.554 |
| 5,127,475 A | 7/1992 | Hayes et al. | 166/301 |
| 5,129,457 A | 7/1992 | Sydansk | 166/274 |
| 5,130,028 A | 7/1992 | Cody et al. | 210/691 |
| 5,134,118 A | 7/1992 | Patel et al. | 507/121 |
| 5,141,920 A | 8/1992 | Bland et al. | 507/136 |
| 5,151,155 A | 9/1992 | Cody et al. | 162/5 |
| 5,156,765 A | 10/1992 | Smrt et al. | 252/307 |
| 5,175,278 A | 12/1992 | Peik et al. | 536/123 |
| 5,247,995 A | 9/1993 | Tjon-Joe-Pin et al. | 166/312 |
| 5,296,164 A | 3/1994 | Thach et al. | 252/307 |
| 5,310,002 A | 5/1994 | Blauch et al. | 166/307 |
| 5,314,644 A | 5/1994 | Michelsen et al. | 261/84 |
| 5,352,436 A | 10/1994 | Wheatley et al. | 424/9 |
| 5,362,713 A | 11/1994 | Westland et al. | 507/100 |
| 5,372,462 A | 12/1994 | Sydansk | 405/264 |
| 5,397,001 A | 3/1995 | Yoon et al. | 209/170 |
| 5,480,589 A * | 1/1996 | Belser et al. | 261/76 |
| 5,495,891 A | 3/1996 | Sydansk | 166/295 |
| 5,513,712 A | 5/1996 | Sydansk | 175/69 |
| 5,514,644 A | 5/1996 | Dobson | 507/111 |
| 5,529,122 A | 6/1996 | Thach | 166/281 |
| 5,565,416 A | 10/1996 | Wu | 507/103 |
| 5,566,760 A | 10/1996 | Harris | 166/308 |
| 5,567,741 A | 10/1996 | Casey et al. | 521/133 |
| 5,591,700 A | 1/1997 | Harris et al. | 507/204 |
| 5,616,541 A | 4/1997 | Dobson, Jr. et al. | 507/145 |
| 5,639,443 A | 6/1997 | Schutt et al. | 424/9.52 |
| 5,654,260 A | 8/1997 | Wu | 507/264 |
| 5,682,951 A | 11/1997 | Sydansk | 166/292 |
| 5,706,895 A | 1/1998 | Sydansk | 166/294 |
| 5,710,110 A | 1/1998 | Cooperman et al. | 507/131 |
| 5,716,910 A | 2/1998 | Totten et al. | 507/102 |
| 5,728,652 A | 3/1998 | Dobson, Jr. et al. | 507/145 |
| 5,783,118 A | 7/1998 | Kolaini | 261/37 |
| 5,804,535 A | 9/1998 | Dobson et al. | 507/145 |
| 5,821,203 A | 10/1998 | Williamson | 507/102 |
| 5,858,928 A | 1/1999 | Aubert et al. | 507/128 |
| 5,881,826 A | 3/1999 | Brookey | 175/72 |
| 5,916,849 A | 6/1999 | House | 507/110 |
| 5,957,203 A | 9/1999 | Hutchins et al. | 166/295 |
| 5,977,030 A | 11/1999 | House | 507/110 |
| 6,123,159 A | 9/2000 | Brookey et al. | 175/72 |
| 6,127,319 A | 10/2000 | House | 507/110 |
| 6,148,917 A | 11/2000 | Brookey et al. | 166/301 |
| 6,156,708 A | 12/2000 | Brookey et al. | 507/102 |

OTHER PUBLICATIONS

SPE 39589 "*Microbubbles: New Aphron Drill–in Fluid Technique Reduces Formation Damage in Horizontal Wells*," Tom Brookey, SPE, ActiSystems, Inc., Feb. 18–19, 1998.

Article entitled "*Drill–in Fluids Improve High–angle Well Production*," Petroleum Engineer Int'l., 1995.

Article entitled "*Microbubbles: Generation and Interaction With Colloid Particles*," J.B. Melville and E. Matijevic, Institute of Colloid and Surface Science and Department of Chemistry, Clarkson College of Technology, Potsdam, New York, 1975.

Article entitled "*Separation of Organic Dyes From Wastewater by Using Colloidal Gas Aphrons*," D. Roy, K.T. Valsarlj, and S.A. Kottai, Marcel Dekker, Inc., 1992.

Article entitled "*Hidraulica Forajului*" (with translation), Oct. 26, 1982.

H1000, Patel et al, Filed Aug. 16, 1990, Published Dec. 3, 1991.

H837, Peiffer et al, Filed Jul. 5, 1989, Published Nov. 6, 1990.

Article entitled "*Foams and Biliquid Foams—Aphrons*", F. Sebba, John Wiley & Sons, 1987.

Article entitled "*Carbohydrate Chemistry: Monosaccharides and Their Oligomers*," by H.S. El Khadem, Academic Press, Inc., 1988.

Article entitled "*Bioactive Carbohydrates: In Chemistry, Biochemistry and Biology*," by J.F. Kennedy and C.A. White, Halsted Press: A division of John Wiley & Sons, 1983.

* cited by examiner

METHOD OF GENERATING GAS BUBBLES IN OLEAGINOUS LIQUIDS

There is disclosed in patent application Ser. No. 09/246,935 filed Feb. 9, 1999, incorporated herein by reference, oleaginous base, re-circulateable, well drilling and servicing fluids containing colloidal gas aphrons (microbubbles).

BACKGROUND OF THE INVENTION

Such fluids comprise an oleaginous continuous phase, one or more viscosifiers that impart an elevated low shear rate viscosity to the fluid of at least 10,000 centipoise, one or more aphron-generating surfactants, and aphrons.

The book by Felix Sebba entitled "Foams and Biliquid Foams—Aphrons", John Wiley & Sons, 1987, incorporated herein by reference, is an excellent source on the preparation and properties of aphrons in aqueous fluids. Aphrons are made up of a core which is often spherical of an internal phase, usually liquid or gas, encapsulated in a thin liquid shell of the continuous phase liquid. This shell contains surfactant molecules so positional that they produce an effective barrier against coalescence with adjacent aphrons.

SUMMARY OF THE INVENTION

I have now determined that gas bubbles and microbubbles can be generated in oleaginous liquids by incorporating into the oleaginous liquid a silicone oil and encapsulating a gas therein.

Thus, it is an object of the invention to provide a method of incorporating microbubbles into oleaginous liquids.

It is another object of the invention to provide oil base well drilling and servicing fluids containing microbubbles therein.

It is still another object of the invention to provide a method drilling a well wherein the novel drilling fluid of this invention is used as the re-circulateable drilling fluid.

These and other objects of the invention will be apparent to one skilled in the art upon reading the specification and claims hereof.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

PREFERRED EMBODIMENTS OF THE INVENTION

In its broadest aspects, the present invention is directed to a method of incorporating microbubbles in oleaginous liquids preferably for use as oil base well drilling and servicing fluids (hereinafter sometimes referred to as "OBWDAS" fluids).

The method comprises adding a silicone oil to the oleaginous liquid and thereafter subjecting the silicone oil-containing oleaginous liquid to mechanical forces in the presence of a gaseous phase. The base oleaginous liquid may be any organic, water insoluble liquid which can be viscosified to the desired extent. Exemplary oleaginous liquids known in the art include petroleum oils or fractions thereof, vegetable oils, and various synthetic organic liquids such as olefins (alpha and internal unsaturation), oligomers of unsaturated hydrocarbons, carboxylic acid esters, phosphoric acid esters, ethers, polyalkyleneglycols, diglymes, acetals, and the like.

Microbubbles are generated in the oleaginous liquid by incorporating a silicone oil in the oleaginous liquid and thereafter subjecting the silicone-containing oleaginous liquid to mechanical forces in the presence of a gaseous phase to generate the microbubbles.

The microbubbles can be generated by means known in the art. In addition to the methods disclosed by Felix Sebba in his book referenced previously, methods are disclosed in Michelsen et al. U.S. Pat. No. 5,314,644, incorporated herein by reference, Yoon et al. U.S. Pat. No. 5,397,001, incorporated herein by reference, Kolaini U.S. Pat. No. 5,783,118, incorporated hereby by reference, Wheatley et al. U.S. Pat. No. 5,352,436, incorporated herein by reference, and U.S. Pat. Nos. 4,162,970; 4,112,025; 4,717,515; 4,304,740; and 3,671,022, each incorporated herein by reference.

High shear mixing wherein a vortex is created in the presence of a gas will entrap gas bubbles in the silicone-containing oleaginous liquid.

Mixing wherein the silicone-containing oleaginous liquid is pumped through an orifice in the presence of a gas wherein the liquid is subjected to a large pressure drop of at least 500 psi, such as from 500 to 5000 psi or more, will generate microbubbles in the oleaginous liquid.

When the silicone-containing oleaginous liquid is used as a well drilling and servicing fluid, microbubbles will also be produced by the pressure drop and cavitation as the fluid is pumped through the drill bit.

The gas used to create the microbubbles may be any gas which is not appreciably soluble in the oleaginous liquid. Thus the gas may be air, nitrogen, carbon dioxide, and the like, including air encapsulated in the fluid during mixing.

The silicone oils useful in the invention are well known in the art and available commercially from such companies as GE Silicones, HULS AMERICA, INC., DOW CORNING, and CK WITCO. The silicone oils are basically siloxane polymers which have a backbone of Si—O linkages. Dimethyl silicone fluids, i.e., polydimethylsiloxanes, are available in various viscosity grades from about 0.5 centistokes at 25° C. to about 2,500,000 centistokes having average molecular weights from about 100 to about 500,00, preferably from about 5 centistokes to about 100,000 centistokes. Also available are polydialkylsiloxanes, polydiphenylsiloxanes, poly(dimethyl/diphenyl)siloxanecopolymers, and polymethyl-alkylsiloxanes, such as polymethyloctylsiloxane and polymethyloctadecylsiloxane.

The concentration of silicone oil required is generally from about 0.5 ppb (0.06 g/cm$^3$) to about 20 ppb (2.4 g/cm$^3$), preferably from about 1 ppb (0.12 g/cm$^3$) to about 10 ppg (1.2 g/cm$^3$). An indication of the volume of microbubbles generated can be obtained by determining the density reduction which occurs upon generating the microbubbles in the fluid. Foaming of the fluid, which is undesirable, may occur if the concentration of silicone oil is excessive. We have determined that the concentration of silicone oil can be increased, without any adverse effect on the fluid, as the LSRV increases. Thus the concentration of silicone oil, which can be determined by routine testing, is the amount required to generate sufficient microbubbles to give the density reduction desired but which is, preferably, insufficient to create a long-lasting foam on the surface of the fluid. The concentration of aphrons in the fluid is preferably from about 5% by volume to about 25%, most preferably from about 5% to about 20% by volume.

The density of the fluids can be adjusted, as required, by the addition of weight materials or the addition of soluble salts to the fluids as is well known in the art. Preferably the weight material is added to the fluid before generation or incorporation of microbubbles therein, thus adjusting the final density of the microbubble-containing fluid to the desired density by the concentration of microbubbles therein.

As indicated, the concentration of microbubbles in the fluid should be less than about 25% by volume at atmospheric pressure. However, on circulation of the fluid in a borehole, the volume of the microbubbles is believed to decrease as the hydrostatic pressure of the fluid increases. Indeed the microbubbles may compress in size to almost no volume depending on the depth of the borehole. The measured density under pressure should be very close to the density of the fluid without any microbubbles. The microbubles do not disappear, however. They are still present, and additional microbubbles will be generated at the face of the bit due to the pressure drop and cavitation. The microbubbles are extremely small, have very high surface area, and are highly energized.

As soon as the fluid exits the bit and starts back up the annulus, some pressure drop begins to occur and the microbubbles will begin to expand. As the fluid moves up the borehole and it encounters a loss to the formation, the microbubbles are filtered into the pore throats, microfractures, or other types of loss zone. These loss zones are areas where pressure drops occur. The microbubbles in these loss zones then expand and aggregate and hence seal the loss zones. The "% microbubbles by volume" in these micro environments is highly variable and will depend on the specific pressure and pressure drop within the loss zones. Thus it is believed that the micro environment density is completely different than the density of the fluid in the borehole.

The density reduction at atmospheric pressure which occurs on entraining up to about 25% by volume of a gas in the fluids of the invention is sufficient to provide the quantity of microbubbles needed in the borehole while allowing the fluid to be recirculatable without causing pump problems.

Additionally, the fluid may contain other functional materials known in the art such as emulsifiers, wetting agents, and the like.

Without being limited hereby, it is believed that the microbubbles present in the fluid effectively seal the formation during drilling or well servicing operations thus preventing the excessive loss of fluid to the formations being drilled or serviced.

The fluids of this invention can be used in conventional drilling and well servicing operations as conducted in the art. Thus in drilling an oil and/or gas well the fluid is circulated from the surface down the drill pipe, coiled tubing, or the like through the bit and up the annulus between the drill pipe and the sides of the borehole back to the surface. The microbubbles in the fluid seal the borehole surface preventing the loss of excessive amounts of fluid to the formations being drilled.

It is preferred that the microbubble-containing fluid of the present invention be utilized in a drilling process wherein the drill bit is a cavitating liquid jet assisted drill bit. Exemplary cavitating liquid jet assisted drill bits are set forth in Johnson, Jr. et al. U.S. Pat. No. 4,262,757, incorporated herein by reference, and Johnson, Jr. et al. U.S. Pat. No. 4,391,339, incorporated herein by reference. Preferably the cavitating jet nozzle in the cavitating liquid jet assisted drill bit includes a pin received at a central position which lowers the pressure of the pressurized drilling fluid such that cavitation bubbles form in the fluid. See for example Henshaw U.S. Pat. No. 5,086,974, incorporated herein by reference, and Henshaw U.S. Pat. No. 5,217,163, incorporated herein by reference.

Similarly, the fluids of the invention can be in well servicing operations such as completion operations, workover operations, sand control operations, frac pack operations, and the like. The fluids can be used as spotting fluids to release pipes and tools stuck in the filter cake on the sides of a borehole by differential sticking.

The stability of the microbubbles in the oleaginous liquid can be increased by increasing the viscosity of the oleaginous liquid, preferably the low shear rate viscosity (hereinafter sometimes referred to as "LSRV"). The LSRV for the purposes of this invention is the viscosity measured on a Brookfield Viscometer at shear rates less than about 1 $sec^{-1}$, such as at 0.3 to 0.5 rpm. The LSRV of the microbubble-containing oleaginous liquid should be at least 10,000 centipoise, preferably at least about 20,000 centipoise, and most preferably at least about 40,000 centipoise. Since the stability of the microbubbles is enhanced as the LSRV increases, a LSRV of several hundred thousand may be desired.

The viscosity of the oleaginous liquid can be increased with various viscosifiers/gellants such as organophilic clays, colloidal fumed silicas, resins, polymers, dimer acids, fatty amine salts of anionic polysaccharides, fatty acid salts of cationic polysaccharides, oil-dispersible/soluble latex-type products, and mixtures thereof as is known in the art.

The organophilic clays useful as viscosifiers to increase the LSRV of the oleaginous fluids of this invention are well known in the art. They comprise reaction products or organic onium compounds with naturally occurring or synthetic clays. The clay portion of the organophilic clay gellants are crystalline, complex inorganic silicates, the exact composition of which cannot be precisely defined since they vary widely from one natural source to another. However, these clays can be described as complex, inorganic silicates, such as aluminum silicates and magnesium silicates, containing, in addition to the complex silicate lattice, varying amounts of cation-exchangeable ions, such as calcium, magnesium, and sodium. Hydrophilic clays which are preferred in this invention are the water-swelling smectite clays, such as montmorillonite, hectorite, saponite and particularly bentonite clay from Wyoming which contains exchangeable sodium ions. Attapulgite clay and saponite clay can also be used as the clay portion of the organophilic clay. The clays may be used in the impure form as such or may be purified by centrifuging an aqueous slurry of the clay.

The organic onium compounds reacted with the smectite clays are desirably acidic salts of primary, secondary and tertiary amines, preferably quaternary ammonium compounds. The onium compounds should contain at least one alkyl, alkylene or alkylidiene radical having at least ten carbon atoms, preferably about 16 to 22 carbon atoms. Typical quaternary ammonium compounds are dimethyl dihydrogenated tallow ammonium chloride, trimethyl hydrogenated tallow ammonium chloride, dimethyl benzyl octadecyl ammonium chloride and methyl benzyl dioctodecyl ammonium chloride. A typical acid salt of an amine is the acid salt of cocoamine. Other organic onium compounds, such as organic phosphonium compounds, can be used. Organic modified clays and their preparation are more fully described in U.S. Pat. Nos. 2,531,427; 2,531,812; 2,966, 506; 3,929,849; 4,287,086; 4,105,578, all of which are herein incorporated by reference.

The preferred organophilic clays for use in the drilling fluids of the present invention are dimethyldihydrogenated tallow ammonium bentonite, dimethylbenzyl-hydrogenated tallow ammonium bentonite, and methylbenzyldihydrogenated tallow ammonium bentonite.

Schumate et al. U.S. Pat. No. 5,021,170, incorporated herein by reference, discloses that a sulfonated, ethylene/propylene/5-phenyl-2-norborene terpolymer (EPDM polymer) and an organophilic clay viscosifier synergistically increase the viscosity and suspension characteristics of invert emulsion drilling fluids, particularly such fluids which have a low aromatic content hydrocarbon as the oleaginous liquid phase. The EPDM polymer is generally described in U.S. Pat. No. 4,442,011, incorporated herein by reference.

Basically, the EPDM polymers have about 5 to about 30 milliequivalents of sulfonate group per hundred grams of the sulfonated polymer, wherein the sulfonated group is neutralized with a metallic cation or an amine or ammonium counterion. The EPDM polymers have about 0.5 to about 20% by weight phenyl norbornene, or preferably about 1 to about 10%, most preferably about 2 to about 8%. The preferred polymers contain about 10 to about 80% by weight ethylene and about 1 to about 10% by weight of 5-phenyl-2-nobornene monomer, the balance of the polymer being propylene. Preferably, the polymer contains from about 30 to about 70% by weight ethylene, e.g., 50 weight percent, and 2 to about 8% phenyl-2-norborene monomer, e.g., 5.0 weight percent.

A typical ethylene/propylene/5-phenyl-2-norborene terpolymer has a Mooney viscosity (ML, 1+8, 212° F.) of about 16 and has an ethylene content of about 50 weight percent and a 5-phenyl-2-norbornene content of about 5 weight percent.

The terpolymers have a number average molecular weight (Mn), as measured by Gel Permeation Chromatograph (GPC), of about 5,000 to about 300,000, more preferably of about 10,000 to about 80,000. The Mooney viscosity of the terpolymer is about 5 to about 90, more preferably about 10 to about 80, most preferably about 15 to about 50.

The gelling agent comprised of the terpolymer and the clay will generally be present in the drilling fluid in an amount of from about 0.5 pounds to about 10 pounds per 42 gallon barrel (ppb) of fluid.

Oehler et al. U.S. Pat. No. 4,816,551, incorporated herein by reference, discloses that certain amide resins provide more shear thinning fluids with improved thixotropy in fluids containing an organophilic clay viscosifier, particularly in low viscosity mineral oils. The amide resins are the reaction products of a dibasic dimerized or trimerized fatty acid, a dialkanolamine, and a dialkylenepolyamine.

Dibasic acids may be the dimerized fatty acids, commercial products prepared by dimerization of unsaturated fatty acids containing at least 8, preferably about 10 or more to about 18 carbon atoms, including 9-dodecanoic(cis), 9-tetradodecanoic(cis), 9-octadecanoic(cis), octadecatetranoic acids, and the like. The typical molecule would contain two carboxyl groups and about 36 carbon atoms in a branched chain configuration. The dibasic trimerized fatty acid may be used which is also a commercial material and similarly prepared, containing about 54 carbon atoms, if at least one of the carboxyl groups is blocked or made inactive by being in the form of an ester group, a salt and the like, i.e., the trimerized fatty acid as used in this invention is dibasic acid. Mixtures of dimerized acids and trimerized acids may be used.

The dialkanolamines include hydroxyalkylamines, for example, materials wherein the alkanol groups contain 1 to 6 carbon atoms, preferably 2 to 4 carbon atoms; including for example diethanol amine, di-n-propanol amine, di-iso-propanol amine, dibutanol amine, dipentanolamine, dihexanol amine, and the like, and combinations thereof. Preferred are diethanol amine and dipropanol amine. Alkyl hydroxyalkyl-amines including ethylhydroxyethyl amine, propylhydroxyethyl amine, butylhydroxy-propyl amine, and the like can also be used.

The polyalkylene polyamines include materials wherein the alkylene groups contain about 1 to 6 carbon atoms, preferably 2 to 4 carbon atoms: "poly" refers to an integer from about 2 to 20, and at least 3 nitrogen atoms. These materials may be represented by the general formula

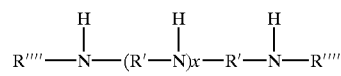

wherein R' is an alkylene group containing 1 to 6 carbon atoms, R"" is hydrogen or an alkyl group containing 1 to 6 carbon atoms, an x is an integer from 1 to 20. Typical useful materials include diethylene triamine, triethylene tetraamine, tetramethylene pentaamine, polyamine HH, polyamine HPA, and the like. Preferred are diethylene triamine and triethylene tetraamine.

The products may be represented by the general formula

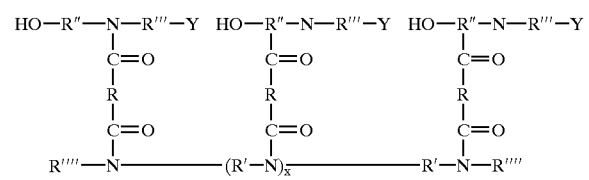

wherein R is an alkylene group containing 20, preferably about 30 to 54 carbon atoms; R' is an alkylene group containing 1 to 6 carbon atoms, R" is an alkylene group containing 1 to 6 carbon atoms, R'" is an alkylene group containing 1 to 6 carbon atoms, R"" is a direct bridge, covalent bond, between N and Y or is a hydrogen or alkyl radical containing 1 to 6 carbon atoms, Y is hydrogen or hydroxy, and x is an integer from 1 to 20.

Cooperman et al. U.S. Pat. No. 5,710,110, incorporated herein by reference, discloses that 0.01 to about 5% by weight of certain amine additive reaction products in combination with one or more rheologically active clay-based materials provide improved anti-settling properties for both oil and invert oil emulsion based drilling fluids. Such rheologically active clay-based materials include organoclays, smectite-type clays including Wyoming bentonite, beneficiated sodium and calcium bentonite and hectorite, and attapulgite clay. Organoclays and method of making them are described, for example, in U.S. Pat. Nos. 5,075,033, 5,130,028, and 5,151,155. Smectite-type clays are cation-exchangeable clays described at length and by chemical formula in U.S. Pat. No. 5,350,562. Bentonite, a particularly useful clay for this invention, is described at length in Carr. Industrial Minerals and Rocks. 6$^{th}$ Edition (1994) in a chapter entitled Bentonite, authored by Drs. Elzea and Murray of Indiana University. Attapulgite clays are well known natural clays which possess cation exchange capacity but of a lower amount than smectite-type clays such as bentonite and hectorite.

The amine additive reaction products comprise one or more reaction products of one or more polyalkoxylated aliphatic amino compounds having a chemical structure represented by the following formula:

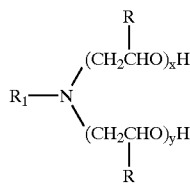

wherein $R_1$ is a straight chain alkyl group derived from fatty sources having 12 to 18 carbon atoms, R is selected from the group consisting of hydrogen, methyl and ethyl, both x and y are at least 1, and the sum of x+y is from 2 to 15 and one or more organic compounds selected from the group consisting of maleic anhydride, phthalic anhydride and mixtures thereof.

An increase in anti-settling properties is achieved from this mixture combination within broad ranges of amines to rheologically active clay. Alternative ways of preparing a drilling fluid according to this invention are to add such cation exchangeable clay-based material to the drilling fluid separately from the above mentioned amine reaction products, to add the amine additive to the drilling fluid when the fluid is being used to drill through domains containing rheologically active clays, or to add the amine alone if the drilling fluid already contains such clay-based materials.

Exemplary polymers useful as viscosifiers in the fluid of this invention are set forth in the following references.

Peiffer et al. U.S. Statutory Invention Registration No. H837, incorporated herein by reference, discloses the use of a water insoluble, hydrocarbon soluble polymeric complex formed from a sulfonated (anionic) polymer and a water insoluble vinyl pyridine (cationic) polymer as a viscosifier for oil-based drilling muds.

Peiffer et al. U.S. Pat. No. 4,978,461, incorporated herein by reference, discloses the use of a thermoplastic terpolymer of p-methylstyrene/metal neutralized styrene sulfonate/styrene as viscosification agents for oil-based drilling muds.

Patel et al. U.S. Pat. No. 4,740,319, incorporated herein by reference, discloses the use of latices comprising a polymer which is the reaction product of a first monomer selected from the group consisting of styrene, butadiene, isoprene, and mixtures thereof and a second functional monomer which contains a radical selected from the group consisting of amide, amine, sulfonate, carboxylic acid, dicarboxylic acid, and combinations thereof, provided that at least one of the functional monomers is a nitrogen containing material selected from the group consisting of amides and amines.

Turner et al. U.S. Pat. No. 4,425,461, incorporated herein by reference, discloses the use of a mixture of a water insoluble neutralized sulfonated thermoplastic polymer and a water insoluble neutralized sulfonated elastomeric polymer as viscosification agents for oil-based drilling muds.

Commercially available polymers include HYBILD™ 201 (BP Chemicals), HYVIS™ (Unocal), and others.

In addition to the silicone oil, the microbubble-containing oleaginous fluids of this invention may contain surfactants such as those disclosed in co-pending U.S. patent application Ser. No. 09/246,935 filed Feb. 9, 1999. The surfactant may also have one or more stabilizers incorporated therein, such as alkyl alcohols, fatty alkanolamides, and alkyl betaines. Generally the alkyl chain will contain from about 10 to about 18 carbon atoms. The aphron-generating surfactant may be anionic, non-ionic, or cationic depending on compatibility with the viscosifier.

The fluorosurfactants include, but are not limited to, (i) fluorinated telomers, (ii) amphoteric fluorosufactants, (iii) polyfluorinated amine oxide, (iv) fluoroalkyl ethylthio polyacrylamides, (v) perfluoroalkyl ethylthiopolyacrylamides, (vi) derivatives of 1-propanaminium, 2-Hydroxy-N,N,N-trimethyl-3-gamma-omega-perfluoro-($C_6$–$C_{20}$-alkyl) thio, chloride, (vii) fluoroalkyl sodium sulfonate, and (viii) sodium salts of 1-propanesulfonic acid, 2-methyl-, 2-{[1-oxo-3[gamma,-omega, -perfluoro-$C_{16}$–$C_{26}$-alkyl) thio} propyl} amino} derivative.

A particularly preferred fluorosurfactant is a mixture of fluoroaliphatic polymeric esters sold by 3M Company under the tradename FLUORAD™ FC 740.

D'Arrigo U.S. Pat. No. 4,684,479, incorporated herein by reference, discloses surfactant mixtures comprising (a) a member selected from the group consisting of glycerol monoesters of saturated carboxylic acids containing from about 10 to about 18 carbon atoms and aliphatic alcohols containing from about 10 to about 18 carbon atoms; (b) a sterol-aromatic acid ester; (c) a member selected from the group consisting of sterols, terpenes, bile acids and alkali metal salts of bile acids; (d) a member selected from the group consisting of sterol esters of aliphatic acids containing from 1 to about 18 carbon atoms; sterol esters of sugar acids; esters of sugar acids and aliphatic alcohols containing from about 10 to about 18 carbon atoms; esters of sugars and aliphatic acids containing from about 10 to about 18 carbon atoms; sugar acids; saponins; and sapogenins; and (e) a member selected from the group consisting of glycerol, glycerol di- or triesters of aliphatic acids containing from about 10 to about 18 carbon atoms and aliphatic alcohols containing from about 10 to about 18 carbon atoms; said components being present in said mixture in a weight ratio a:b:c:d:e of 2–4:0.5–1.5:0.5–1.5:0–1.5:0–1.5.

As indicated, the microbubble-containing oleaginous liquids of the invention are useful as oil and gas well drilling and servicing fluids. Optionally,the OBWDAS fluids may contain water as a dispersed phase, various emulsifying agents, wetting agents, weighting agents, fluid loss control agents, water soluble salts, and the like as is known in the art.

The following examples are presented to demonstrate the invention but should not be construed as limiting the scope of the invention. The silicone oils evaluated are as follows: polydimethylsiloxane having nominal viscosities of 1,000, 10,000, or 100,000 centistokes. Abbreviations used in the table or this specification are as follows: cp=centipoise; g=grams; ml=milliliters; $cm^3$=cubic centimeters; v=volts; OS=off-scale, >2000 v; sec=seconds; ppb=pounds per barrel; min—minutes; rpm=revolutions per minute; ctsk=centistokes; ppg=pounds per gallon; LSRV=low shear rate viscosity measured on a Brookfield Viscometer at 0.3–0.5 rpm. The Fann Rheology were determined at ambient temperature (22° C.) using the procedure set forth in the American Petroleum Institute Bulletin RP13-B.

EXAMPLE 1

Fluids were prepared by mixing together on a high shear blender 340 ml of Iso-Teq internal olefin oil, 9.3 g of VEN-GEL 420 organophilic attapulgite, 4.3 g of Claytone II organophilic bentonite, 1.4 g of propylene carbonate, 2.0 g of aluminum stearate, 10 ml of water, and the concentration of the silicone oils set forth in Table I. Upon cooling to ambient temperature the Brookfield and Fann rheologies were obtained. The fluids were thereafter hot rolled at 185° F. for 16 hours, cooled, and the Brookfield and Fann rheologies, emulsion stability, and density before and after mixing were obtained. The % density reduction, which is a measure of the concentration of microbubbles in the fluids, was calculated as follows:

$$\% \text{ Density Reduction} = 100\left(\frac{\text{Density Before Mixing} - \text{Density After Mixing}}{\text{Density Before Mixing}}\right)$$

TABLE I

All Fluids Contain 350 ml Iso-Teq Oil, 9.3 g VEN-GEL 420 Organophilic Attapulgite, 4.3 g CLAYTONE II Organophilic Bentonite, 1.4 g Propylene Carbonate, 2.0 g Aluminum Stearate, 10 ml Water, and the Concentration of Silicone Oil Set Forth in the Table

| Fluid | I-1 | I-2 | I-3 | I-4 | I-5 | I-6 | I-7 | I-8 |
|---|---|---|---|---|---|---|---|---|
| Silicone Oil Viscosity, ctsk ($\times 10^3$) | 1 | 1 | 1 | 10 | 100 | 100 | 100 | 100 |
| Silicone Oil, g | 2 | 3 | 4 | 3 | 1 | 2 | 3 | 4 |
| INITIAL RHEOLOGY | | | | | | | | |
| Brookfield Rheology | | | | | | | | |
| 0.3 rpm ($\times 10^{-3}$), cp | 46 | 52 | 82.7 | 58 | 103 | 82 | 44.7 | 70.7 |
| 0.5 rpm ($\times 10^{-3}$), cp | 30.8 | 36.4 | 59.6 | 32.4 | 47.6 | 47.6 | 28.8 | 52.8 |
| 100 rpm, cp | 444 | 310 | 528 | 234 | 444 | 496 | 414 | 416 |
| Fann Rheology | | | | | | | | |
| 600 rpm | 55 | 42 | 58 | 39 | 50 | 61 | 56 | 60 |
| 300 rpm | 44 | 32 | 48 | 29 | 40 | 51 | 43 | 49 |
| Plastic Viscosity | 11 | 10 | 10 | 10 | 10 | 10 | 13 | 11 |
| Yield Point | 33 | 22 | 38 | 19 | 30 | 41 | 30 | 38 |
| HOT ROLLED 16 HOURS AT 185° F. | | | | | | | | |
| Brookfield Rheology | | | | | | | | |
| 0.3 rpm ($\times 10^{-3}$), cp | 115 | 96.7 | 106 | 153 | 125 | 108 | 141 | 94.7 |
| 0.5 rpm ($\times 10^{-3}$), cp | 72.8 | 70 | 75.2 | 103 | 68.8 | 87.2 | 72 | 69.2 |
| 100 rpm, cp | 818 | 1210 | 1218 | 962 | 932 | 686 | 984 | 956 |
| Fann Rheology | | | | | | | | |
| 600 rpm | 100 | 99 | 115 | 86 | 91 | 103 | 105 | 117 |
| 300 rpm | 82 | 85 | 98 | 71 | 69 | 80 | 90 | 95 |
| Plastic Viscosity | 18 | 14 | 17 | 15 | 22 | 23 | 15 | 22 |
| Yield Point | 64 | 71 | 81 | 56 | 47 | 57 | 75 | 73 |
| 10 sec. Gel Strength | 53 | 52 | 76 | 45 | 43 | 53 | 60 | 73 |
| 10 min. Gel Strength | 56 | 48 | 60 | 43 | 52 | 52 | 57 | 50 |
| Emulsion Stability, v | OS | OS | OS | OS | OS | OS | OS | OS |
| Density (before mixing), ppg | 6.6 | 6.8 | 6.7 | 6.8 | 6.7 | 6.7 | 6.7 | 6.7 |
| Density (after mixing), ppg | 5.8 | 5.5 | 5.7 | 5.9 | 5.7 | 5.9 | 5.7 | 5.8 |
| % Density Reduction | 12.1 | 19.1 | 14.9 | 13.2 | 14.9 | 11.9 | 14.9 | 13.4 |

What is claimed is:

1. A method of generating gas microbubbles suspended in oleaginous liquids which comprises adding a silicone oil to the oleaginous liquid and thereafer subjecting the oleaginous liquid to mechanical forces in the presence of a gas.

2. The method of claim 1 wherein the silicone oil is a polydimethylsiloxane oil having a nominal viscosity at 25° C. of about 0.5 centistokes to about 2,500,000 centistokes.

3. The method of claim 1 wherein the oleaginous liquid is selected from the group consisting of petroleum oils or fractions thereof, alpha olefins, internal olefins, oligomers of unsaturated hydrocarbons, carboxylic acid esters, phosphoric acid esters, ethers, polyalkylene glycols, diglymes, acetals, and mixtures thereof.

4. The method of claim 2 wherein the oleaginous liquid is selected from the group consisting of petroleum oils or fractions thereof, alpha olefins, internal olefins, oligomers of unsaturated hydrocarbons, carboxylic acid esters, phosphoric acid esters, ethers, polyalkylene glycols, diglymes, acetals, and mixtures thereof.

5. The method of claim 1 wherein the oleaginous liquid is selected from the group consisting of petroleum oils or fractions thereof, alpha olefins, internal olefins, oligomers of unsaturated hydrocarbons, and mixtures thereof.

6. The method of claim 2 wherein the oleaginous liquid is selected from the group consisting of petroleum oils or fractions thereof, alpha olefins, internal olefins, oligomers of unsaturated hydrocarbons, and mixtures thereof.

7. The method of claim 1 wherein the gas is selected from the group consisting of air, nitrogen, carbon dioxide, and mixtures thereof.

8. The method of claim 2 wherein the gas is selected from the group consisting of air, nitrogen, carbon dioxide, and mixtures thereof.

9. The method of claim 5 wherein the gas is selected from the group consisting of air, nitrogen, carbon dioxide, and mixtures thereof.

10. The method of claim 6 wherein the gas is selected from the group consisting of air, nitrogen, carbon dioxide, and mixtures thereof.

11. The method of claim 1 wherein the mechanical forces are selected from the group consisting of mixing the silicone oil-containing oleaginous liquid wherein a vortex is created, pumping the silicone oil-containing oleaginous liquid wherein the liquid is subjected to a pressure drop of at least 500 psi, and mixtures thereof.

12. The method of claim 2 wherein the mechanical forces are selected from the group consisting of mixing the silicone oil-containing oleaginous liquid wherein a vortex is created, pumping the silicone oil-containing oleaginous liquid wherein the liquid is subjected to a pressure of at least 500 psi, and mixtures thereof.

13. The method of claim 4 wherein the mechanical forces are selected from the group consisting of mixing the silicone oil-containing oleaginous liquid wherein a vortex is created, pumping the silicone oil-containing oleaginous liquid wherein the liquid is subjected to a pressure of at least 500 psi, and mixtures thereof.

14. The method of claim 6 wherein the mechanical forces are selected from the group consisting of mixing the silicone oil-containing oleaginous liquid wherein a vortex is created, pumping the silicone oil-containing oleaginous liquid wherein the liquid is subjected to a pressure of at least 500 psi, and mixtures thereof.

15. The method of claim 8 wherein the mechanical forces are selected from the group consisting of mixing the silicone oil-containing oleaginous liquid wherein a vortex is created, pumping the silicone oil-containing oleaginous liquid wherein the liquid is subjected to a pressure of at least 500 psi, and mixtures thereof.

16. An oil base well drilling and servicing fluid comprising an oleaginous liquid as the continuous liquid phase having incorporated therein one or more viscosifiers such that the fluid has a low shear rate viscosity as measured with a Brookfield Viscometer at 0.5 rpm of at least about 10,000 centipoise, a silicone oil for generating microbubbles in the oleaginous liquid, and microbubbles, wherein the microbubbles are generated by subjecting the silicone oil-containing oleaginous liquid to mechanical forces in the presence of a gas.

17. The fluid of claim 16 wherein a target density of the fluid is achieved by varying the concentration of microbubbles.

18. The fluid of claim 17 wherein the silicone oil is a polydimethylsiloxane oil having a nominal viscosity at 25° C. of about 5 centistokes to about 100,000 centistokes.

19. The fluid of claim 18 wherein the oleaginous liquid is selected from the group consisting of petroleum oils or fractions thereof, alpha olefins, internal olefins, oligomers of unsaturated hydrocarbons, and mixtures thereof.

20. The fluid of claim 19 wherein the gas is selected from the group consisting of air, nitrogen, carbon dioxide, and mixtures thereof.

21. The fluid of claim 20 wherein the mechanical forces are selected from the group consisting of mixing the silicone oil-containing oleaginous liquid wherein a vortex is created, pumping the silicone oil-containing oleaginous liquid wherein the liquid is subjected to a pressure of at least 500 psi, and mixtures thereof.

22. The fluid of claim 16, 17, 18, 19, 20, or 21 wherein the low shear rate viscosity is at least about 40,000 centipoise, and wherein the fluid contains from about 5% to about 25% by volume of the microbubbles.

23. A method of drilling a well wherein there is circulated within the wellbore the fluid of claim 16, 17, 18, 19, 20, or 21.

24. The method of drilling a well wherein there is circulated within the wellbore the fluid of claim 22.

25. A chemical composition comprising:
an oleaginous liquid;
silicone oil;
a viscosifier; and
microbubbles, wherein the composition is a drilling fluid.

26. The composition according to claim 25 wherein the oleaginous liquid comprises a continuous phase and further comprising a discontinuous aqueous phase.

27. The composition according to claim 25 wherein the viscosifier is selected from the group consisting of organophilic clays, colloidal fumed silicas, resins, polymers, dimer acids, fatty amine salts of anionic polysaccharides, fatty acid salts of cationic polysaccharides, oil-dispersible/soluble latex-type products, and mixtures thereof.

28. The composition according to claim 25 wherein the low shear rate viscosity of the fluid as measured with a Brookfield Viscometer at 0.5 rpm is at least 40,000 centipoise.

29. The composition according to claim 25 wherein the low shear rate viscosity of the fluid as measured with a Brookfield Viscometer at 0.5 rpm is at least 40,000 centipoise.

30. The composition according to claim 25 wherein the oleaginous liquid is selected from the group consisting of petroleum oils or fractions thereof, alpha olefins, internal olefins, oligomers of unsaturated hydrocarbons, carboxylic acid esters, phosphoric acid esters, ethers, polyalkylene glycols, diglymes, acetals, and mixtures thereof.

31. The composition according to claim 25 wherein the silicone oil contains a polydimethylsiloxane.

32. The composition according to claim 31 wherein the silicone oil has a nominal viscosity at 25° C. of about 0.5 centistokes to about 2,500,000 centistokes.

33. The composition according to claim 25 wherein the silicone oil contains a polydialkylsiloxane.

34. The composition according to claim 33 wherein the silicone oil has a nominal viscosity at 25° C. of about 0.5 centistokes to about 2,500,000 centistokes.

35. The composition according to claim 25 wherein the silicone oil contains a polydiphenylsiloxane.

36. The composition according to claim 35 wherein the silicone oil has a nominal viscosity at 25° C. of about 0.5 centistokes to about 2,500,000 centistokes.

37. The composition according to claim 25 wherein the silicone oil contains a poly(dimethyl/diphenyl)siloxanecopolymer.

38. The composition according to claim 37 wherein the silicone oil has a nominal viscosity at 25° C. of about 0.5 centistokes to about 2,500,000 centistokes.

39. The composition according to claim 25 wherein the silicone oil contains a polymethyl-alkylsiloxane.

40. The composition according to claim 39 wherein the silicone oil has a nominal viscosity at 25° C. of about 0.5 centistokes to about 2,500,000 centistokes.

41. The composition according to claim 25 wherein the microbubbles comprise less than 25% by volume of the fluid.

42. The composition according to claim 25 wherein the microbubbles comprise from about 5% to about 20% by volume of the fluid.

43. The composition according to claim 25 wherein the drilling fluid is recirculateable.

44. The composition according to claim 25 wherein the microbubbles prevent loss of excess drilling fluid into the formation.

45. The composition according to claim 25 wherein the microbubbles effectively seal the formation.

46. A chemical composition comprising:
an oleaginous liquid;
silicone oil;
a viscosifier; and
microbubbles, wherein the composition is a servicing fluid.

47. The composition according to claim 46 wherein the oleaginous liquid comprises a continuous phase and further comprising a discontinuous aqueous phase.

48. The composition according to claim 46 wherein the viscosifier is selected from the group consisting of organophilic clays, colloidal fumed silicas, resins, polymers, dimer acids, fatty amine salts of anionic polysaccharides, fatty acid salts of cationic polysaccharides, oil-dispersible/soluble latex-type products, and mixtures thereof.

49. The composition according to claim 46 wherein the low shear rate viscosity of the fluid as measured with a Brookfield Viscometer at 0.5 rpm is at least 20,000 centipoise.

50. The composition according to claim 46 wherein the low shear rate viscosity of the fluid as measured with a Brookfield Viscometer at 0.5 rpm is at least 40,000 centipoise.

51. The composition according to claim 46 wherein the oleaginous liquid is selected from the group consisting of petroleum oils or fractions thereof, alpha olefins, internal olefins, oligomers of unsaturated hydrocarbons, carboxylic acid esters, phosphoric acid esters, ethers, polyalkylene glycols, diglymes, acetals, and mixtures thereof.

52. The composition according to claim 46 wherein the silicone oil contains a polydimethylsiloxane.

53. The composition according to claim 52 wherein the silicone oil has a nominal viscosity at 25° C. of about 0.5 centistokes to about 2,500,000 centistokes.

54. The composition according to claim 46 wherein the silicone oil contains a polydialkylsiloxane.

55. The composition according to claim 54 wherein the silicone oil has a nominal viscosity at 25° C. of about 0.5 centistokes to about 2,500,000 centistokes.

56. The composition according to claim 46 wherein the silicone oil contains a polydiphenylsiloxane.

57. The composition according to claim 56 wherein the silicone oil has a nominal viscosity at 25° C. of about 0.5 centistokes to about 2,500,000 centistokes.

58. The composition according to claim 46 wherein the silicone oil contains a poly(dimethyl/diphenyl) siloxanecopolymer.

59. The composition according to claim 58 wherein the silicone oil has a nominal viscosity at 25° C. of about 0.5 centistokes to about 2,500,000 centistokes.

60. The composition according to claim 46 wherein the silicone oil contains a polymethyl-alkylsiloxane.

61. The composition according to claim 60 wherein the silicone oil has a nominal viscosity at 25° C. of about 0.5 centistokes to about 2,500,000 centistokes.

62. The composition according to claim 46 wherein the microbubbles comprise less than 25% by volume of the fluid.

63. The composition according to claim 46 wherein the microbubbles comprise from about 5% to about 20% by volume of the fluid.

64. The composition according to claim 46 wherein the servicing fluid is recirculateable.

65. The composition according to claim 46 wherein the microbubbles prevent loss of excess servicing fluid into the formation.

66. The composition according to claim 46, wherein the microbubbles effectively seal the formation.

67. A process for drilling or servicing a wellbore in a subterranean formation wherein a drilling or servicing fluid is circulated in the wellbore, comprising:
utilizing as the drilling or servicing fluid an oleaginous liquid, silicone oil and microbubbles.

68. The process according to claim 67 wherein the oleaginous liquid comprises a continuous phase and further comprising a discontinuous aqueous phase.

69. The process according to claim 67 wherein the drilling or servicing fluid further comprises a viscosifier.

70. The process according to claim 69 wherein the viscosifier is selected from the group consisting of organophilic clays, colloidal fumed silicas, resins, polymers, dimer acids, fatty amine salts of anionic polysaccharides, fatty acid salts of cationic polysaccharides, oil-dispersible/soluble latex-type products, and mixtures thereof.

71. The process according to claim 69 wherein the low shear rate viscosity of the fluid as measured with a Brookfield Viscometer at 0.5 rpm is at least 20,000 centipoise.

72. The process according to claim 69 wherein the low shear rate viscosity of the fluid as measured with a Brookfield Viscometer at 0.5 rpm is at least 40,000 centipoise.

73. The process according to claim 67 wherein the oleaginous liquid is selected from the group consisting of petroleum oils or fractions thereof, alpha olefins, internal olefins, oligomers of unsaturated hydrocarbons, carboxylic acid esters, phosphoric acid esters, ethers, polyalkylene glycols, diglymes, acetals, and mixtures thereof.

74. The process according to claim 67 wherein the silicone oil contains a polydimethylsiloxane.

75. The process according to claim 74 wherein the silicone oil has a nominal viscosity at 25° C. of about 0.5 centistokes to about 2,500,000 centistokes.

76. The process according to claim 67 wherein the silicone oil contains a polydialkylsiloxane.

77. The process according to claim 76 wherein the silicone oil has a nominal viscosity at 25° C. of about 0.5 centistokes to about 2,500,000 centistokes.

78. The process according to claim 67 wherein the silicone oil contains a polydiphenylsiloxane.

79. The process according to claim 78 wherein the silicone oil has a nominal viscosity at 25° C. of about 0.5 centistokes to about 2,500,000 centistokes.

80. The process according to claim 67 wherein the silicone oil contains a poly(dimethyl/diphenyl) siloxanecopolymer.

81. The process according to claim 80 wherein the silicone oil has a nominal viscosity at 25° C. of about 0.5 centistokes to about 2,500,000 centistokes.

82. The process according to claim 67 wherein the silicone oil contains a polymethyl-alkylsiloxane.

83. The process according to claim 82 wherein the silicone oil has a nominal viscosity at 25° C. of about 0.5 centistokes to about 2,500,000 centistokes.

84. The process according to claim 67 wherein the microbubbles comprise less than 25% by volume of the fluid.

85. The process according to claim 67 wherein the microbubbles comprise from about 5% to about 20% by volume of the fluid.

86. The process according to claim 67 wherein the drilling or servicing fluid is recirculateable.

87. The process according to claim 67 wherein the microbubbles prevent loss of excess drilling or servicing fluid into the formation.

88. The process according to claim 67 wherein the microbubbles effectively seal the formation.

89. The composition according to claim 25 wherein the low shear rate viscosity of the fluid as measured with a Brookfield Viscometer at 0.5 rpm is at least 103,000 centipoise.

90. The composition according to claim 46 wherein the low shear rate viscosity of the fluid as measured with a Brookfield Viscometer at 0.5 rpm is at least 103,000 centipoise.

91. The process according to claim 69 wherein the low shear rate viscosity of the fluid as measured with a Brookfield Viscometer at 0.5 rpm is at least 103,000 centipoise.

* * * * *

UNITED STATES PATENT AND TRADEMARK OFFICE
CERTIFICATE OF CORRECTION

PATENT NO. : 6,649,571 B
DATED : November 18, 2003
INVENTOR(S) : Julie Benedetta Maria Aline Morgan It is certified that error appears in the above-identified patent and that said Letters Patent is hereby corrected as shown below:

Column 12,
Line 10, claim 28 should read:
The composition according to claim 25 wherein the low shear rate viscosity of the fluid as measured with a Brookfield Viscometer at 0.5 rpm is at least 20,000 centipoise.

Signed and Sealed this

Twenty-seventh Day of July, 2004

JON W. DUDAS
*Acting Director of the United States Patent and Trademark Office*